H. C. Beshler,
Corn-Planter.
N⁰ 92,780.      Patented Jul. 20. 1869.
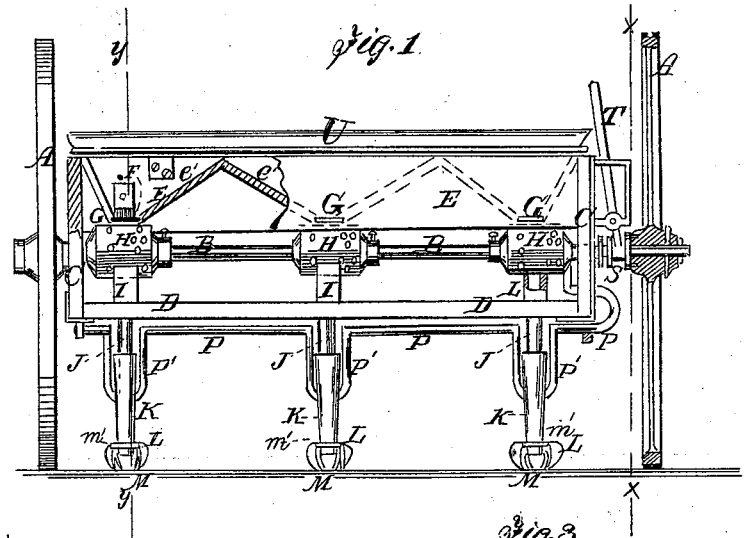
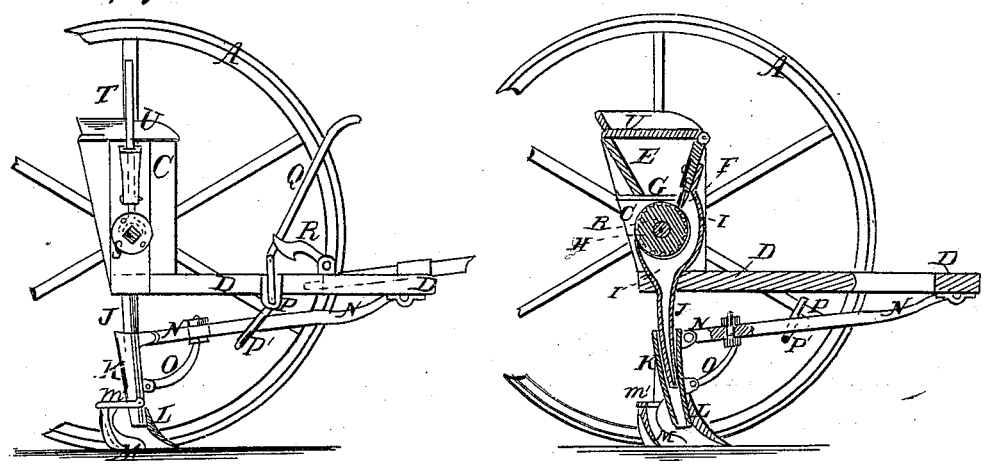
WITNESSES.      INVENTOR.

United States Patent Office.

H. C. BESHLER, OF BERRYSBURG, PENNSYLVANIA.

Letters Patent No. 92,780, dated July 20, 1869.

---

IMPROVEMENT IN CORN-PLANTERS.

---

The Schedule referred to in these Letters Patent and making part of the same.

---

*To all whom it may concern:*

Be it known that I, H. C. BESHLER, of Berrysburg, in the county of Dauphin, and State of Pennsylvania, have invented a new and useful Improvement in Corn-Planters; and I do hereby declare that the following is a full, clear, and exact description thereof, which will enable others skilled in the art to make and use the same, reference being had to the accompanying drawing, forming part of this specification, in which—

Figure 1 is a rear view of my improved machine, part being broken away to show the construction.

Figure 2 is an end view of the same, partly in section, through the line *x x*, fig. 1.

Figure 3 is a detail sectional view of the same, taken through the line *y y*, fig. 1.

Similar letters of reference indicate corresponding parts.

My invention has for its object to furnish a simple, strong, durable, reliable, and cheap corn-planter, and which shall be so constructed that it may be conveniently adjusted to drop the corn continuously, kernel by kernel, or in hills, as may be desired; and It consists in the construction and combination of the various parts, as hereinafter more fully described.

A are the wheels, which revolve upon the journals of the axle B, which works in bearings in the posts C, to the lower ends of which is attached the frame D, and to the upper parts of which is attached the hopper E.

The interior of the hopper is divided into as many compartments as the machine is designed to plant rows, by the inclined boards *e'*, so as to guide the corn to the discharge-openings in the bottom of said hopper.

The discharge-openings of the hopper are each provided with a brush, F, to prevent more kernels than enough to fill the recesses in the dropping-cylinders from passing out.

The discharge-openings of the hopper are also each provided with slides G, passing in through slits in the rear side of the hopper E, to close the said discharge-openings when desired.

H are the dropping-cylinders, which are adjustably attached to the axle B.

Upon one part of the cylinders H is formed a continuous row of holes, each of a size to contain a single kernel, so that when the said cylinders are adjusted to bring the said row of holes beneath the discharge-openings of the hopper, a continuous succession of kernels will be deposited in the ground, at uniform distances apart.

Upon the other end or part of the dropping-cylinders H are formed groups of three or more recesses, each recess being of such a size as to contain a single kernel, so that when the dropping-cylinders are adjusted to bring the said groups beneath the discharge-openings of the hopper, the corn may be dropped in hills at uniform distances apart.

I are spouts, attached to the frame D and to the hopper E, in such positions as to receive the corn and conduct it to the tubes J, which pass down through the hollow standards K, and conduct the said corn to the ground.

To the lower end of the hollow standards K are attached the double mould-board plows L, by which the furrows are opened to receive the corn.

M are the small covering-plows, which are attached to small frames or U-shaped bars *m'*, that pass around the lower ends of the standards K, and are hinged at the forward sides of said standards.

The covering-plows are so arranged as to be drawn along at each side of the seeds in the bottom of the furrow, covering them sufficiently, and still leaving an open furrow for convenience in the subsequent operations.

The upper ends of the hollow standards K are hinged to the rear ends of the beams N, the forward ends of which are hinged to the forward part of the frame D.

The draught-strain upon the standards K and plows L is sustained by the arms or braces O, the lower ends of which are hinged to the lower parts of the standards K, and the upper ends of which pass up through holes in the beams N, and are adjustably secured in place by nuts screwing upon the said ends, and placed, one above and one below said beams, as shown in figs. 2 and 3. This allows the pitch of the plow to be adjusted at pleasure.

P is a rod, placed beneath the forward part of the frame D, and made with downwardly-projecting loops P', through which the plow-beams N pass, so that by partially revolving the said rod, the plows will all be raised from the ground.

Upon one end of the rod P is formed, or to it is attached a lever, Q, extending up into such a position that it can be conveniently reached and operated by the driver from his seat.

R is a catch, attached to the frame D, in such a position as to take hold of the lever Q and hold it when in position to hold the plows suspended.

One of the wheels A is made to carry the axle B with it in its revolution, by the clutch S, sliding upon said axle B, and operated to clutch or release said wheel by the lever T, the forked lower end of which rides in a groove in the said clutch.

The lever T is pivoted to the post or board C, passes up through a catch-slot, attached to said post, into such a position that it may be conveniently reached and operated by the driver from his seat.

When it is desired not to go to the expense of making the clutch S T, the wheel A may be made to carry the axle B with it in its revolution by a pin passed through the hub of said wheel and through the journal of said axle, as shown in fig. 1.

When the clutch S T is used, the slides G need not be, unless it is desired to plant some of the rows, and not the others.

The machine may be made of any desired width, and arranged to plant any desired number of rows, according to the strength of the team by which it is to be drawn.

The driver's seat U extends the entire length of the hopper, so that the driver may sit at either end as convenience may require, in gauging the rows.

The lower ends of the braces O are hinged to the lower parts of the hollow standards K by wooden pins, so that, should the plows strike an obstruction, the said wooden pins may break, and thus prevent the plow from being broken.

Having thus described my invention,

I claim as new, and desire to secure by Letters Patent—

1. The dropping-cylinders H, when made adjustable upon the axle B, and provided near one end with a continuous row of recesses, and near the opposite end with groups of recesses, whereby said cylinders are adapted to drop the seeds from the hoppers, either in hills or in continuous rows, as herein set forth and shown.

2. An improved corn-planter, formed by the combination of the wheels A, axle B, dropping-cylinders H, hopper E, spouts I, conductor-tubes J, hollow standards K, double mould-board plows L, hinged covering-plows M m', plow-beams N, adjustable braces O, and rod P, provided with the loops P', and lever Q, said parts being constructed, arranged, and operating substantially as herein shown and described, and for the purposes set forth.

H. C. BESHLER.

Witnesses:
H. L. LARK,
J. P. BASSLER.